July 10, 1956 J. R. DONNAY 2,754,451
VOLTAGE SUPPLY ARRANGEMENTS FOR TELEVISION CAMERAS
Filed March 13, 1953
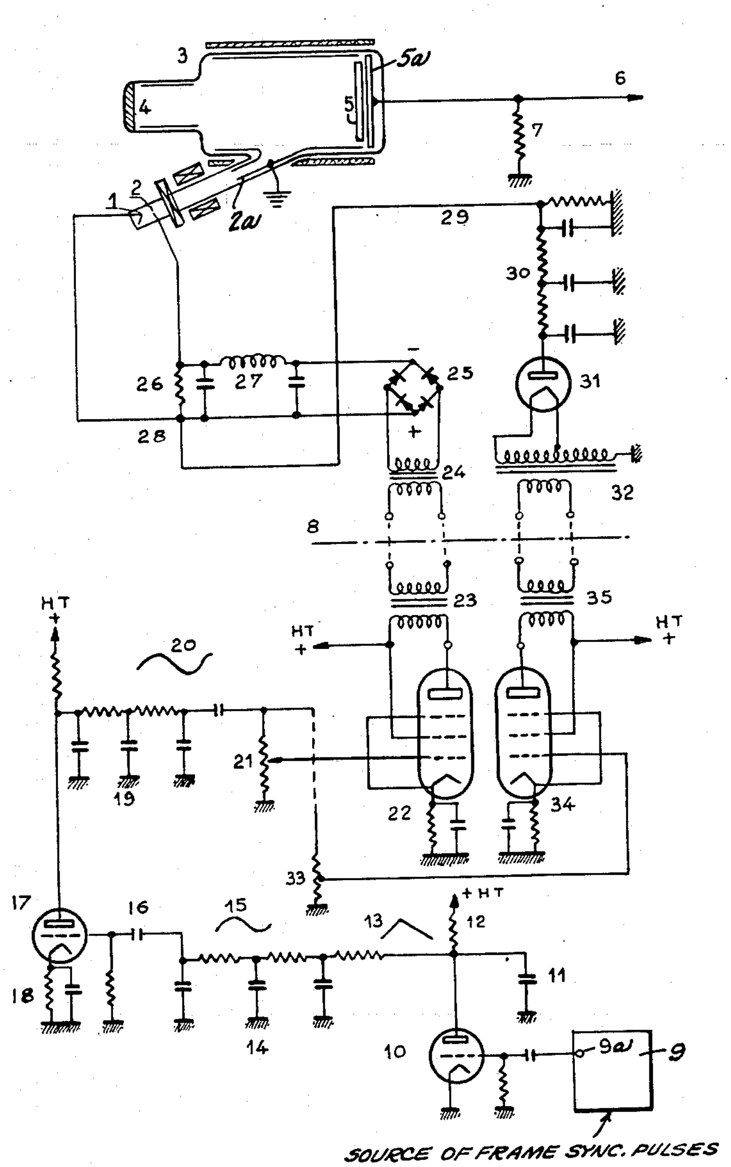
INVENTOR
Jacques Donnay
By Ralph B. Stewart
attorney 2,754,451

VOLTAGE SUPPLY ARRANGEMENTS FOR TELEVISION CAMERAS

Jacques R. Donnay, Paris, France, assignor to Societe Nouvelle de l'Outillage R. B. V. et de la Radio-Industrie (R. B. V.-R. I.), Paris, France, a joint-stock company Application March 13, 1953, Serial No. 342,203

6 Claims. (Cl. 315—22)

The invention is concerned with an arrangement for supplying correct working voltages to the pick-up tube of an electron camera. As is well known, it is necessary to supply the tube with adjustable working potentials at least as far as the electron gun is concerned. It is usual to have the gun of the tube operating with a negative grid to cathode polarization, both potentials on the grid and cathode of the gun being highly negative with respect to the earth potential at which the anode is maintained.

The absolute necessity of providing an adjustable grid to cathode D. C. potential in the electron gun is made difficult to meet since it is essential that the voltages supplied to the tube should be free from any hum or any variation coming from the phase or frequency fluctuations of the general A. C. supplies whether from the mains or a local source of A. C. power.

This condition requires that the rectified voltages should be thoroughly filtered, so as to get rid of these fluctuations even when they are very slow. This means that the filter has to be designed with a high degree of inertia or delay.

If this condition is not fulfilled, the picture will show tendencies towards instability and the same line of successive fields or frames will not be reproduced at the same place on the screen of the receiving tube.

In this case the filter will transmit with a considerable delay any variation due to a new adjustment of the bias voltage controlling means. This lag is not to be tolerated under the conditions encountered in any type of broadcast.

The object of the invention is to provide voltage supply sources of electronic cameras which deliver a voltage which is free from the fluctuation which can impair the quality of the picture reproduced.

A second object of the invention is to provide voltage supply sources for electronic camera pick-up tubes which are easily adjusted and show no delay between the instant when the new adjustment is made or telecontrolled and the instant when the new value of voltage is applied to the pick-up tube.

Another object of the invention is to provide voltage supply sources for pick-up tubes which are self contained in the camera and the working of which is asynchronous with respect to the A. C. general supplies.

According to the invention, one at least of the polarization voltages for the pick-up tube (the cathode to anode voltage of the gun) is generated by adding two D. C. voltages, a first high voltage delivered by a rectifier-filter unit of long delay and a second adjustable low D. C. voltage developed by a rectifier supplied with a voltage derived from the frame synchronisation signals. The latter signal is supplied by the frame time base generator of the camera, and is independent of the phase or frequency fluctuations of the A. C. supply circuit.

According to an extension of the invention the high voltage may be also obtained from the frame synchronisation pulses or saw-tooth signals.

The filter associated with the voltage source supplied with the frame synchronisation signals need not present a high efficiency since it may form only a small fraction of the total voltage applied to the pick-up tube, and, what is more important, a slight variation of voltage at the frame scanning frequency and synchronised with the frame scanning will not show in the quality of the reproduced picture, or at least will show much less than the same voltage variation at any other frequency, as far as stability is concerned.

The invention will be better understood from the following description taken in connection with the accompanying drawing, wherein the figure shows diagrammatically one embodiment by way of example.

The pick-up tube represented by elements 1 to 5 is of the kind known under the name of supericonoscope, the electron gun of which includes a cathode 1 and a modulator electrode or grid 2, as does any type of pick-up tube electron gun. In one type of tube, the cathode should be maintained at −1500 v. and the grid somewhere around −1600 v. with respect to ground, which means that the modulator electrode or grid is negative with respect to the cathode. The anode of the electron gun is formed of a conductive coating 2*a* which is grounded.

Bulb 3 of the pick-up tube encloses also a photocathode 4 on which is focussed the picture to be transmitted and a target plate or mosaic 5 on which impinge the photoelectrons from photocathode 4 and forming on plate 5 an electronic picture of the object to be televised. The video signal is obtained on signal plate 5*a*, located behind the mosaic, when the mosiac 5 is scanned by the electron beam of the gun, the signal plate 5*a* being connected to ground through a suitable load impedance 7 and feeding video signal to the following amplifying stages.

The camera includes the pick-up tube and its supply, that is to say all the circuit elements which are represented above the dot and dash line 8. The elements shown below that line are usually included in the means for synchronisation and for supply of the equipment.

This equipment includes a time base generator assembly indicated at 9 for supplying to the point 9*a* a series of synchro-pulses or pips at the frame frequency, for instance 60 per second. This assembly may be synchronous with the A. C. main supply, but is designed so as to be independent of the phase or frequency fluctuations of said supply.

This series of frame synchronizing pulses is first converted into a sinusoidal wave by means of the following circuit. Pulses from source 9 are supplied to the input current of tube 10 which performs an integrating action in its output circuit by means of its load resistor 12 connecting the anode of the tube with the source of anode current +HT and by the anode-to-earth capacity 11. Tube 10 delivers saw-tooth signals as represented at 13 at the frame frequency.

This saw-tooth signal is fed to a low-pass filter 14 comprising a series of condenser shunted resistors which attenuate the amplitude of the high frequency harmonics included in the saw-tooth signal. Filter 14 delivers a signal the tops of which are round instead of pointed as in the saw-tooth, but which is not yet a sinusoidal wave. Waveform 15 is transmitted from filter 14 through a coupling condenser 16 feeding the control grid of amplifier tube 17, the cathode lead of which includes a condenser shunted resistor 18 connected to ground. The anode of tube 17 is connected through a suitable coupling resistor to a positive terminal of a source of high tension current +HT. The anode load of valve 17 is formed of a second filter 19 of the same type as the filter 14, which eliminates the remaining harmonics and delivers a purely sinusoidal wave 20.

This wave is applied to potentiometer 21, the moving arm of which is connected to the control grid of a first amplifier tube 22 in the anode circuit of which there is connected the primary coil of a transformer 23. The secondary coil of said transformer feeds the transmission line connecting the equipment to the camera. The line is terminated on the matching transformer 24 of the camera unit.

This transmission line transmits A. C. energy at the frame frequency, such as 110 v. A. C. at 60 cycles per second.

Transformer 24 feeds a rectifier such as a ring of dry rectifiers 25. The positive (+) and negative (−) outputs are respectively connected to the cathode 1 and the grid 2 of the pick-up tube 3 by means of the load resistor 26 shunting the hum eliminating filter 27 comprising a single low-pass filter network having an inductor in the series arm and two condensers in the shunt arms. The values of the capacitance and the inductance are chosen fairly low, so that the time delay of the filter will be small with respect to the frame frequency, that is, the cut-off frequency is high compared to the frame frequency. The small rectified voltage thus produced is independent of the phase of frequency fluctuations or the A. C. mains supply.

By modifying the setting of potentiometer 21 it is possible to control without disturbing the broadcast and without any noticeable delay, the cathode to grid operating voltage of the pick-up tube. The adjustment range due to potentiometer 21 has to be chosen according to each type of pick-up tube used. A general range of about 100 v. is sufficient for almost all the tubes in ordinary use at the present time.

The high working voltage of −1500 v. applied between the cathode 1 and ground must be kept constant during the broadcast, once it has been fixed according to the type of tube used. This high voltage is supplied from a suitable source through lead 29 to the output terminal 28 of filter 27 which is connected to the cathode 1. The high voltage is obtained by rectification of the A. C. supply voltage supplied by transformer 32 to rectifier 31 and filtered by the low-pass filter 30 the time delay of which may be as high as necessary to provide for a complete removal of the A. C. components from the rectified voltage. The cut-off frequency of filter 30 may be of the order of the frame frequency.

As shown by the dotted line by connecting potentiometer 21 to potentiometer 33, transformer 32 may be fed from the same energy source as transformer 24. This is to be used when no A. C. main supply is to be found on the camera or on the feeding cable of the camera. The sinusoidal voltage derived from 33 is amplified by tube 34 and supplied to transformer 32 through transformer 35.

Potentiometer 33 need not necessarily be adjustable. It should however be of the multicontact type so that the high bias voltage should be set according to each type of pick-up tube liable to be used with the camera unit.

What I claim is:

1. An arrangement for generating operating voltages for a television pickup tube including an electron gun comprising at least a cathode, a control grid and an anode, said arrangement comprising a first voltage source delivering high direct current voltage between said cathode and said anode, and a second direct current voltage source for applying a second voltage between said cathode and said grid, said second voltage source comprising a source of frame synchronizing pulses, means controlled by said synchronizing pulses for producing alternating current of frame frequency, rectifying means for rectifying said alternating current, and a low-pass filter receiving rectified current from said rectifying means and applying said second direct current voltage to said cathode and grid elements, said filter having a cut-off frequency which is high compared to the frame frequency.

2. An arrangement as claimed in claim 1 and including means for varying the amplitude of said alternating current and thereby to vary the value of said second direct current voltage.

3. An arrangement for generating a grid-biasing voltage for the electron gun of a television pickup tube having a cathode and a control grid, comprising a source of synchronizing pulses of frame frequency, means controlled by said synchronizing pulses for producing alternating current of frame frequency, rectifying means for rectifying said alternating current, and a low-pass filter receiving rectified current from said rectifying means and applying a direct current voltage between said grid and said cathode, said filter having a cut-off frequency which is high compared to the frame frequency.

4. An arrangement as claimed in claim 3 and including means for instantaneously varying the amplitude of said alternating current and thereby to vary the value of said grid-biasing voltage.

5. An arrangement as claimed in claim 1 wherein said first voltage source comprises means controlled by said alternating current and producing high-voltage alternating current of frame frequency, second rectifying means for rectifying said high-voltage alternating current, and a low-pass filter receiving rectified current from said second rectifying means and deriving said high direct-current voltage, said second filter having a cut-off frequency of the order of magnitude of the frame frequency.

6. An arrangement for generating an operating voltage for a cathode ray tube employed in a television system, comprising a source of frame synchronizing pulses, means controlled by said synchronizing pulses for producing alternating current of frame frequency, rectifying means for rectifying said alternating current, and a low-pass filter receiving rectified current from said rectifying means and applying a direct-current voltage derived therefrom to an electrode of said tube.

References Cited in the file of this patent

UNITED STATES PATENTS

| | | |
|---|---|---|
| 2,449,524 | Witherby | Sept. 14, 1948 |
| 2,627,588 | Knight | Feb. 3, 1953 |
| 2,653,251 | Petroff | Sept. 22, 1953 |
| 2,678,405 | Goodrich | May 11, 1954 |
| 2,687,493 | Kirkwood | Aug. 24, 1954 |